(12) United States Patent
Taal

(10) Patent No.: US 7,946,943 B2
(45) Date of Patent: May 24, 2011

(54) METHOD AND DEVICE FOR CONTROLLING AN AUTOMATIC TRANSMISSION

(75) Inventor: Martin Bastiaan Taal, Billericay (GB)

(73) Assignee: Ford Global Technologies, LLC, Dearborn, MI (US)

( * ) Notice: Subject to any disclaimer, the term of this patent is extended or adjusted under 35 U.S.C. 154(b) by 426 days.

(21) Appl. No.: 12/233,777

(22) Filed: Sep. 19, 2008

(65) Prior Publication Data

US 2009/0082173 A1 Mar. 26, 2009

(30) Foreign Application Priority Data

Sep. 26, 2007 (DE) .......................... 10 2007 045 848

(51) Int. Cl.
*F16H 31/00* (2006.01)
(52) U.S. Cl. ...................................................... 475/123
(58) Field of Classification Search .................. 475/118, 475/119, 123
See application file for complete search history.

(56) References Cited

U.S. PATENT DOCUMENTS

| 5,788,596 | A | * | 8/1998 | Robinson et al. ............. 475/118 |
| 5,906,559 | A | * | 5/1999 | Murasugi et al. ............... 477/93 |
| 7,128,686 | B2 | | 10/2006 | Hitch et al. |
| 7,331,902 | B2 | * | 2/2008 | Runde ........................... 477/117 |
| 2010/0240484 | A1 | * | 9/2010 | Taal ............................... 475/116 |

FOREIGN PATENT DOCUMENTS

EP 0933562 12/2003

* cited by examiner

*Primary Examiner* — Dirk Wright
(74) *Attorney, Agent, or Firm* — David B. Kelley

(57) ABSTRACT

The invention relates to a method and a device for controlling an automatic transmission, the automatic transmission (100) comprising a single-stage planetary gear train (110) in combination with a two-stage planetary gear train (120), and provision being made for a brake band (B1) assigned to the large sun gear of the two-stage planetary gear train (110) and a brake coupling (B2) assigned to the planet carrier of the two-stage planetary gear train (120). In order to reduce idling vibrations, the brake band (B1) and the brake coupling (B2) are actuated simultaneously for at least some of the time during an operating state in which the internal combustion engine is idling.

12 Claims, 4 Drawing Sheets

METHOD AND DEVICE FOR CONTROLLING AN AUTOMATIC TRANSMISSION

FIELD OF THE INVENTION

The invention relates to a method and a device for controlling an automatic transmission

BACKGROUND OF THE INVENTION

It is nowadays generally necessary in diesel-powered motor vehicles with automatic transmission to take measures in order to reduce idling vibrations when the automatic transmission is in the "D" ("Drive") position. This is usually done via a method of control referred to as NI or NIC control (NIC="neutral idle control"), in which the torque transmission from the converter turbine to the transmission and onwards to the drive shafts is reduced by means of a slipping input clutch. This is also referred to in the case of a six-speed automatic transmission of the so-called "Le Pelletier" type as a C1 clutch. The slipping C1 clutch enables the turbine to rotate at a speed approximately 90 rpm below the idling speed of the internal combustion engine, thereby reducing the converter output torque. The output torque to the axle shafts is then approximately equal to the product of the engine torque and the transmission ratio. This output torque constitutes an external load for the power train, which has to be borne or compensated for by the corresponding response torque of the engine support brackets. These loads acting on the axle shafts and the engine support brackets lead to a high noise level and to the transmission of vibrations into the vehicle interior via the struts and the vehicle body.

Since load reduction by means of the NI method has proved inadequate, a further additional measure taken has been to shift into second gear whilst idling in the "D" drive position of the transmission, thereby further reducing the output torque. Even with this additional measure, however, intrusive idling vibrations are still generated. Although shifting even higher, i.e. into third gear, has also been considered, this may have negative effects on the rollback behavior when negotiating a gradient and can also lead to jerky starting and to a reduction in the service life of the input clutch, since in third gear rapid internal rotations occur in the transmission.

U.S. Pat. No. 7,128,686 B2 discloses a method and a device for the synchronized control of a power-take-off (PTO) unit for supplying winches and lifting appliances, for example, from the power train of a motor vehicle, the transmission drive shaft being locked by an actuation of "internal brakes", in order to facilitate a clutch engagement between to stationary shafts when the PTO unit is connected.

EP 0 933 562 B1 discloses a control valve system for an automatic transmission, one of the clutches used being situated in the forward gear on the torque input side of one of the transmission elements and a second of the clutches used being situated in the reverse gear on the torque input side of another of the transmission elements, and forward engagement and reverse engagement control valve means being provided, which can be actuated with adjustable pressures via solenoid-actuated valve devices.

SUMMARY OF THE INVENTION

The invention relates to a method for controlling an automatic transmission in a vehicle powered by an internal combustion engine, the automatic transmission comprising a single-stage planetary gear train in combination with a two-stage planetary gear train or a Ravigneaux planetary gear train, and provision being made for a brake band assigned to the large sun gear of the two-stage planetary gear train and a brake coupling assigned to the two-stage planet carrier.

The method is characterized in that the brake band and the brake coupling are actuated simultaneously for at least some of the time during an operating state in which the internal combustion engine is idling.

According to the present invention both the planet carrier and the sun gear of the two-stage planetary gear train are locked in relation to the transmission housing through actuation of the brake band and the brake coupling, with the result that the axle shafts are completely decoupled from the engine torque, since the transmission input torque is internally cancelled out by the torque of the transmission housing, bypassing the axle shafts. In this way the transmission of torque and vibrations to the output shaft is effectively reduced. At the same time, according to the invention the input shaft is not locked but instead continues to rotate at a speed in the engine speed range. No load is exerted on the actual engine support brackets—apart from the weight of the power train.

According to a preferred embodiment of the invention the actuation of the brake band and the brake coupling is maintained until the turbine speed is zero. This serves in particular to avoid an otherwise frequently observed and unwanted forwards movement of the vehicle on leaving the idling mode of operation, which is also referred to as "neutral idle exit jerk" and which derives from the inertial effect of a rapid turbine speed reduction, shortly before the internal combustion engine begins to generate the drive torque. A braking of the moment of inertia of the turbine leads to an acceleration of the moment of inertia of the vehicle, if the two are engaged via the input clutch. According to the invention this effect is avoided if the brake band and the brake coupling remain actuated until the turbine speed is zero rpm. Since there is not yet any clutch connection between the turbine and the vehicle during this braking phase, a further positive effect is that the input clutch can be swiftly locked without any further control, which gives the vehicle a more rapid starting facility. According to the aforementioned preferred embodiment of the invention, therefore, the inertial torque is supported by the brake band and the brake coupling, since remain actuated until the turbine speed is zero.

According to a further preferred embodiment the turbine is rotated for at least some of the time during the simultaneous actuation of the brake band and the brake. This rotation of the speed the turbine may be performed, in particular, at a speed which is 80 to 100 rpm, preferably about 90 rpm, lower than the idling speed of the internal combustion engine. The input shaft and the turbine therefore have the facility to rotate, which allows a low input torque. The rotating turbine also means that the vibrations occurring on the engine support bracket are also low. Due to the low loads acting on the engine support bracket and the low engine vibrations, the "noise, vibration and harshness" (NVH) effects can also be substantially reduced or minimized. In the same way any unwanted acceleration from rest can be prevented and any starting delay minimized.

According to a further preferred embodiment a clutch is provided for coupling a planet carrier of the single-stage planetary gear train to the small sun gear of the two-stage planetary gear train, the simultaneous actuation of the brake band and the brake coupling occurring at least some of the time with the clutch slipping. This slipping input clutch means that the engine torque can be low. The output torque is zero, and the loads acting on the engine support bracket are low.

According to a further preferred embodiment of the invention the input clutch is temporarily fully opened, in order to allow a slight rotation of gear wheels of the two-stage planetary gear train, and thereby to remove any residual loads from the shift position preceding the "NIC" by relieving the axle half-shafts acting as torsion springs.

According to a further preferred embodiment of the invention the simultaneous actuation of the brake band and the brake coupling occurs only when the vehicle is stationary. In particular, an enhanced safeguard against accidental locking of the transmission gear wheels at high vehicle speeds is preferably achieved, which as explained below can be obtained by a dual or redundant monitoring of the output speed.

Here a sensor device, which generates a sensor signal only when the vehicle is stationary, is preferably used in order to ensure that a simultaneous actuation of the brake band and the brake coupling occurs only when the vehicle is stationary. This has the advantage that in order to provide the safeguard function a simultaneous activation of the brake band and the brake coupling can be prevented even in the event of a defective speed sensor.

In a preferred development the sensor device for detecting the stationary state of the vehicle has at least two single sensors, which each generate a signal complementary to the other if the vehicle is not stationary. A stationary state of the vehicle is detected when the signal from one single sensor remains in a first state for a predetermined length of time and the signal from the other single sensor remains in the complementary state to the first state for a predetermined length of time. In this configuration a defect of one of the single sensors leads means that a stationary state of the vehicle will not be indicated. In principle, such a sensor device may also be used for other purposes in which it is a question of reliably detecting that a mechanism is stationary.

Although reference is made here to a brake coupling and a brake band, this is not to be interpreted as restricting the precise technical embodiment. Rather these terms serve only to distinguish which of the two brakes is activated. It goes without saying that the brake coupling referred to here may also be embodied as a brake band, and said brake band also as a brake coupling, and both of them in any other manner suited to fulfilling the inventive brake function.

The invention further relates to a device for controlling an automatic transmission, which is designed to perform a method having the features described above.

Further developments of the invention are set forth in the description and the claims.

BRIEF DESCRIPTION OF THE DRAWINGS

The invention will be explained below on the basis of preferred embodiments and with reference to the drawings attached, in which.

DETAILED DESCRIPTION OF AN EMBODIMENT OF THE INVENTION

Figure 1:
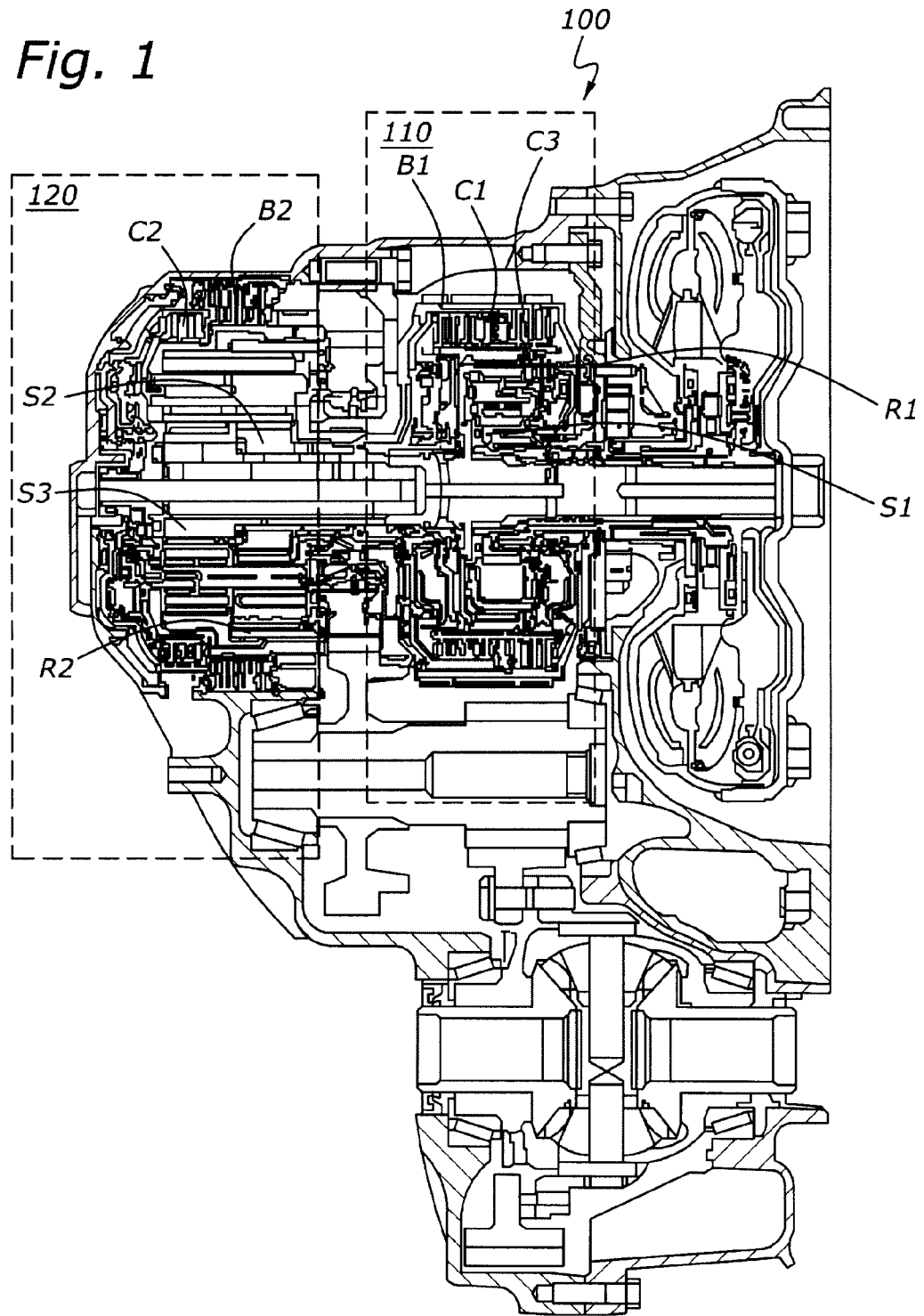
FIG. 1 shows a cross sectional view of the structure of a six-speed automatic transmission, in which the inventive control is implemented in a preferred embodiment.
Figure 2:
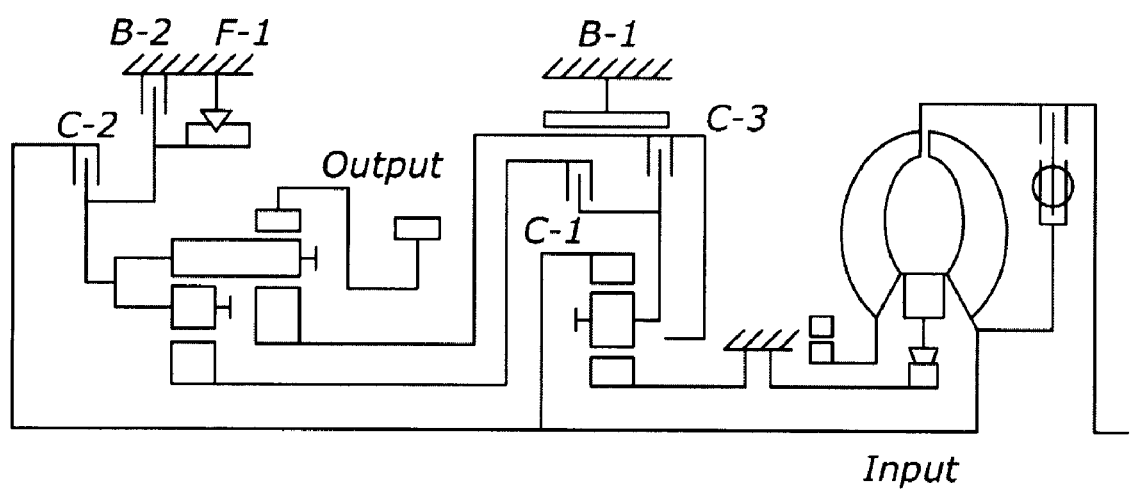
FIG. 2 shows a schematic representation of the gear train of the six-speed automatic transmissions in FIG. 1.

The inventive method and device for controlling an automatic transmission are embodied in a six-speed automatic transmission 100, represented schematically in FIGS. 1 and 2, which combines a single-stage planetary gear train 110 with a two-stage planetary gear train or a Ravigneaux train 120. This known construction is also referred to as a "Le Pelletier" type. FIG. 1 here shows a cross sectional view of the structure of the transmission and FIG. 2 shows a schematic representation of the gear train.

In the structure according to FIG. 1 the single-stage planetary gear train 110 serves as speed-reduction or step-down transmission and has a sun gear S1, a ring gear R1, planetary gears and a planet carrier. The sun gear S1 is permanently fixed. The ring gear R1 is connected to the turbine shaft.

The two-stage planetary gear train 120 or the Ravigneaux train has a rear, (small) sun gear S3, a front (large) sun gear S2, a ring gear R3, short planetary gears, long planetary gears and a planet carrier. The planet carrier of the single-stage planetary gear train 110 can be coupled to the rear sun gear S3 of the Ravigneaux train via the clutch C1 and/or to the front sun gear S2 of the Ravigneaux train via the clutch C3.

In the first, second, third and fourth gears the clutch C1 is closed. In the third gear and in the fifth gear and in the reverse gear the clutch C3 is engaged. The ring gear R2 of the Ravigneaux transmission is coupled to the drive shafts via the intermediate and output stage. By means of further actuators of the "Le Pelletier" type, the free wheel can lock the planet carrier of the Ravigneaux train in the first gear, the clutch C2 can couple the turbine shaft to the planet carrier of the Ravigneaux train in the fourth, fifth and sixth gears, the brake band B1 can lock the sun gear S2 of the Ravigneaux train in the second gear and sixth gear, and the brake coupling B2 can lock the planet carrier of the Ravigneaux train in the reverse gear (always) and in the first gear (during a braking sequence).

The automatic transmission 100 can be shifted up into the second gear in a known manner by coupling, the sun gear S2 to the transmission housing via the brake band B1. It is furthermore possible to prevent a stoppage of the turbine, if the clutch C1 slips whilst coupling the turbine shaft to the rear sun gear S3 of the Ravigneaux transmission. This allows the turbine shaft to rotate at a speed approximately 90 rpm less than the engine speed, whilst the sun gear S3 is stationary.

According to the invention the brake coupling B2 is now actuated in addition to the brake band B1 during the NIC control. During the NIC control the input torque for the Ravigneaux train, which is transmitted from the turbine to the sun gear S3 via the single-stage planetary gear train 110 and the clutch C1, is carried through the transmission housing via the brake band B1 and through the drive shaft via the ring gear R2. As a result there is an output torque on the drive shaft. The planet carrier of the Ravigneaux transmission remains without any load and does not carry the input torque.

Figure 4:
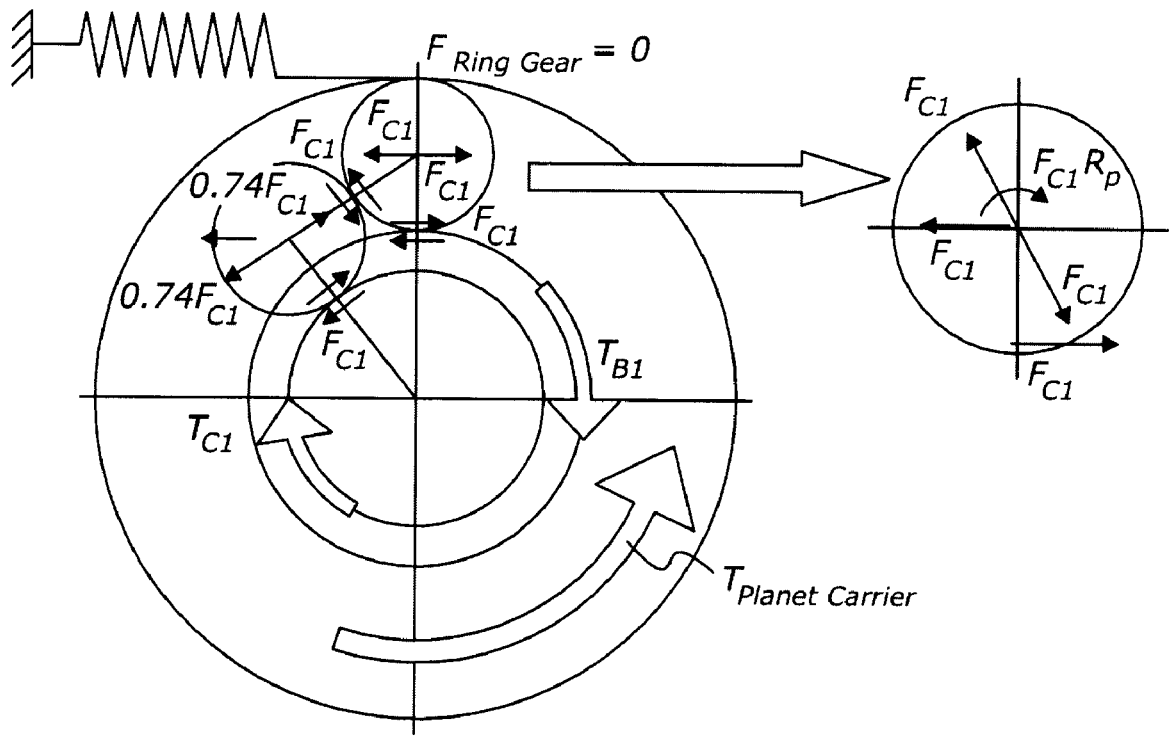
FIG. 4 shows a schematic diagram of forces intended to explain the operating principle of a simultaneous actuation of brake band and brake coupling undertaken according to the inventive method.

According to FIG. 4 both the planet carrier and the sun gear S2 of the two-stage planetary gear train 120 are locked owing to the actuation the brake coupling B2, so that the outer planetary gear cannot rotate around the sun gear S2. The two-stage planetary gear train 120 is therefore internally locked. The torque generated via the turbine and acting via the clutch C1, the sun gear S3 and the inner planetary gear now generates a reaction torque corresponding to a force $F_{C1}$ in the contact to the sun gear S2 and the shaft of the outer planetary gear mounted on the planet carrier. The turbine torque therefore acts on an internally locked transmission without any effect on the ring gear and the output shaft.

Owing to the additional actuation of the brake coupling B2, the input torque is supported by the transmission housing in two ways, that is firstly via the brake band B1, and secondly via the planet carrier and the brake coupling B2. Since, according to the invention, the engine torque is not carried by the drive shaft, the engine torque is directly carried only through the transmission housing. Consequently, the torque between the engine and the automatic transmission 100 is exclusively an internal torque, which has no effect either on the drive shafts, or—as a reaction thereto—on the engine support bracket. Accordingly the engine support brackets are not, as hitherto, subjected to a load, so that any noise transmission to the vehicle body, as when in the neutral (N) position, is reduced.

Since the NIC control is usually activated once the vehicle has been brought to rest in the "D" drive position, the drive shafts may still be subjected to loads from the previous running state. In order to dissipate this load, it may be necessary to briefly relax or release the input clutch C1 completely, thus allowing a slight rotation of the gear wheels of the Ravigneaux transmission and relieving the drive shafts. Briefly releasing the input clutch C1 is therefore also particularly advantageous in relieving the drive shafts.

According to a further aspect of the invention it is ensured that a simultaneous actuation of the brake band B1 and the brake coupling B2 can occur only when the vehicle is stationary. This takes account of the fact that a simultaneous actuation of the brake band B1 and the brake coupling B2 whilst the vehicle is in motion constitutes a source of danger, since it might be no longer possible to control the vehicle with the automatic transmission locked.

This safety measure can be embodied by means of a suitable device, which generates a corresponding signal when the vehicle is at a standstill (and only then). This embodiment has the advantage that in the event of a malfunction of this device, said signal is not generated, which although then leading to an increase in the noise generated (=NVH="noise, vibration and harshness") during the NIC control, does not lead to a dangerous driving situation. Said signal-generating device may also be embodied by means of suitable hardware (for example, hardware already present on the vehicle).

Figure 3A:
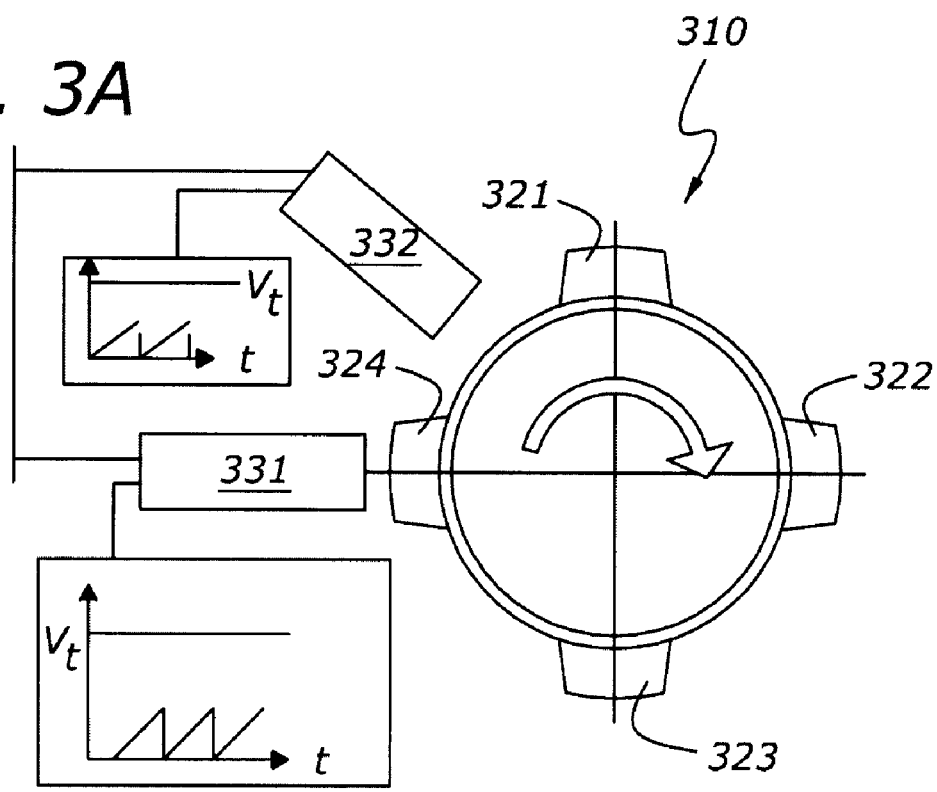
FIGS. 3a-b show schematic representations of a sensor arrangement used in the inventive control according to a preferred embodiment.
Figure 3B:
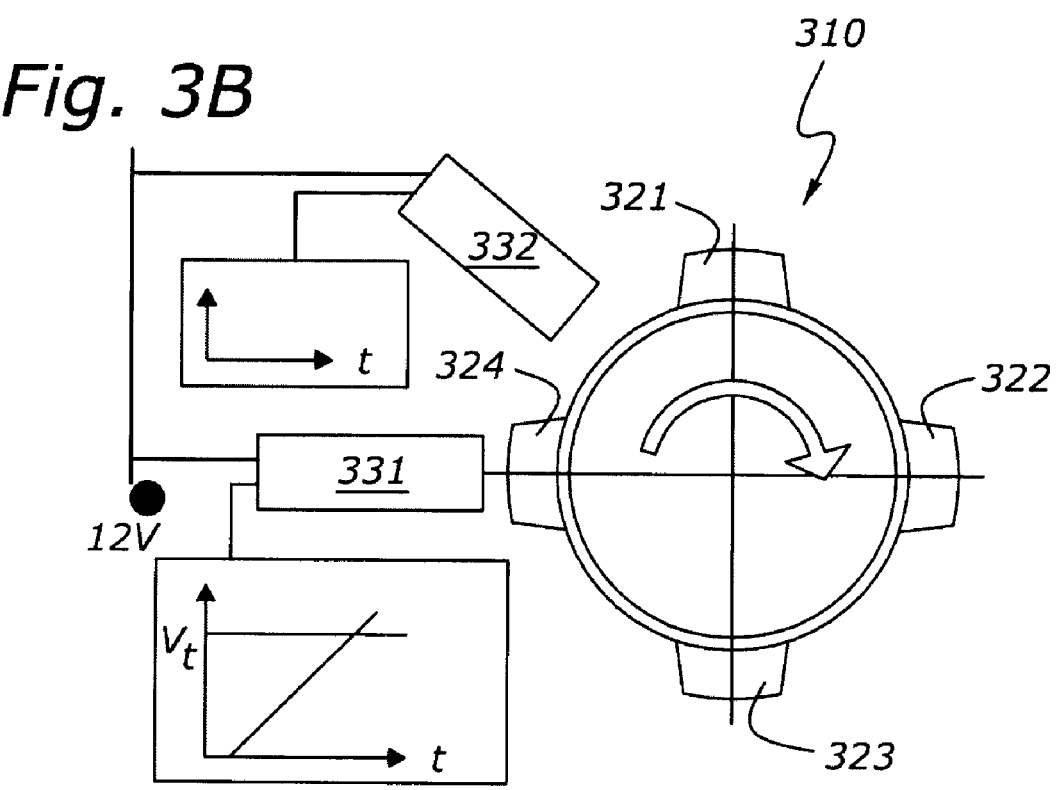

For this purpose, for example, any component that rotates when the vehicle wheels turn (such as the driven gear wheels of the output stage) may be equipped with a rotating gear wheel 310 according to FIGS. 3a and 3b, the teeth 321-324 of which activate two speed sensors 331 and 332, which are embodied as Hall sensors, for example, and are arranged at two different positions on the circumference of the gear wheel 310. The arrangement is chosen so that when one of the teeth 321-324 is located opposite the one speed sensor 331, a gap is located opposite the other speed sensor 332. The signal from each speed sensor 331 and 332 is used separately to trigger a voltage generator with a steadily rising voltage, in which the output value of the voltage generator can increase to a saturation value. The voltage signal from the generator drops immediately back to zero as soon as the respective speed sensor 331 or 332 no longer delivers a signal, which signifies that the relevant tooth 321, 322, 323 or 324 has distanced itself from the speed sensor 331 or 332. When the gear wheel rotates, the voltage generators generate sawtooth voltage profiles for both teeth, the rate of increase of the voltage generator being selected so that, even under slow rotation of the gear wheel, the saturation value of neither voltage generator is attained and the signal returns to zero beforehand.

When the gear wheel 310 does not rotate on the other, one of the two speed sensors 331 and 332 is in the position to trigger the respective voltage generator for long enough, so that this can exceed a predefined threshold value. The other speed sensor 331 or 332 does not trigger the voltage generator, since it is situated opposite a gap between the teeth 321-324.

It can now be ensured, by means of an electrically actuated safety valve, that the brake band B1 and the brake coupling B2 can both be actuated, and only actuated simultaneously when
(a) the voltage signal delivered by the one speed sensor 331 or 332 has exceeded a predefined threshold value, and
(b) the voltage signal delivered by the other speed sensor 332 or 331 is at zero.

If one of the speed sensors has a malfunction (for example, it constantly delivers a high or low signal), the other speed sensor will still generate the sawtooth voltage, if the vehicle is in motion. Consequently the safety function will be implemented by preventing a simultaneous activation of the brake band B1 and the brake coupling B2, even in the event of a defect of one speed sensor, so that the system is "fail-safe" in respect of unwanted simultaneous activation of both brake components. Although simultaneous activation of the two brake components is prevented in the event of a defect of one speed sensor, this nevertheless represents only a loss in terms of comfort and not a safety risk, as would otherwise be the case.

I claim:

1. A method for controlling an automatic transmission in a vehicle powered by an internal combustion engine, the automatic transmission (100) comprising a single-stage planetary gear train (110) in combination with a two-stage planetary gear train (120), and provision being made for a brake band (B1) assigned to a sun gear of the two-stage planetary gear train (110) and a brake coupling (B2) assigned to the two-stage planetary gear train (120), wherein the brake band (B1) and the brake coupling (B2) are actuated simultaneously for at least some of the time during an operating state in which the internal combustion engine is idling.

2. The method as claimed in claim 1, wherein a clutch (C1) is provided for coupling a planet carrier of the single-stage planetary gear train (110) and a sun gear (S3) of the two-stage planetary gear train (120), the simultaneous actuation of the brake band (B1) and the brake coupling (B2) occurring at least some of the time when the input clutch (C1) is slipping.

3. The method as claimed in claim 1, wherein the turbine is rotated for at least some of the time during the simultaneous actuation of the brake band (B1) and the brake coupling (B2).

4. The method as claimed in claim 3, wherein during this rotation the speed of the turbine rotates at least some of the time at a speed which is 80 to 100 rpm, preferably about 90 rpm, less than the idling speed of the internal combustion engines.

5. The method as claimed in claim 1, wherein the simultaneous actuation of the brake band (B1) and the brake coupling (B2) is maintained until the turbine speed is zero.

6. The method as claimed in claim 1, wherein the input shaft is rotated for at least some of the time during the simultaneous actuation of the brake band (B1) and the brake coupling (B2).

7. The method as claimed in claim 2, wherein the input clutch (C1) is temporarily fully released, in order to allow a slight rotation of gear wheels of the two-stage planetary gear train (120) and/or to relieve the drive shaft.

8. The method as claimed in claim 1, wherein the simultaneous actuation of the brake band (B1) and the brake coupling (B2) occurs only when the vehicle is stationary.

9. The method as claimed in claim 8, wherein a sensor device (310), which generates a sensor signal only when the vehicle is stationary, is used in order to ensure that a simultaneous actuation of the brake band (B1) and the brake coupling (B2) occurs only when the vehicle is stationary.

10. The method as claimed in claim 9, wherein the sensor device (310) for detecting the stationary state of the vehicle has at least two single sensors (331, 332), which each generate a changing signal complementary to the other if the vehicle is not stationary, and that a stationary state of the vehicle is detected when the signal from one single sensor (331) remains in a first state for a predetermined length of time and the signal from the other single sensor (332) remains in the complementary state to the first state for a predetermined length of time.

11. The method as claimed in claim 1, wherein the two-stage planetary gear train (120) is embodied as a Ravigneaux transmission.

12. A device for controlling an automatic transmission, wherein the device is designed for performing a method as claimed in one of the preceding claims.

* * * * *